United States Patent
Kim

(10) Patent No.: US 12,358,551 B2
(45) Date of Patent: Jul. 15, 2025

(54) METHOD AND APPARATUS FOR CONTROLLING ELECTRONIC POWER STEERING SYSTEM

(71) Applicant: HL MANDO CORPORATION, Pyeongtaek-si (KR)

(72) Inventor: Hoseok Kim, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 83 days.

(21) Appl. No.: 18/223,915

(22) Filed: Jul. 19, 2023

(65) Prior Publication Data
US 2024/0067261 A1    Feb. 29, 2024

(30) Foreign Application Priority Data
Aug. 25, 2022    (KR) .................... 10-2022-0106582

(51) Int. Cl.
| | |
|---|---|
| B62D 5/04 | (2006.01) |
| B62D 15/02 | (2006.01) |
| G07C 5/08 | (2006.01) |

(52) U.S. Cl.
CPC .......... *B62D 5/0481* (2013.01); *B62D 5/046* (2013.01); *B62D 15/021* (2013.01); *G07C 5/0808* (2013.01); *G07C 5/0816* (2013.01); *B60Y 2400/90* (2013.01)

(58) Field of Classification Search
None
See application file for complete search history.

(56) References Cited

U.S. PATENT DOCUMENTS

| | | | | |
|---|---|---|---|---|
| 8,150,582 | B2 * | 4/2012 | Blommer | B62D 5/0472 701/44 |
| 8,406,956 | B2 * | 3/2013 | Wey | B62D 6/00 180/443 |
| 9,845,109 | B2 * | 12/2017 | George | B62D 6/006 |
| 11,305,813 | B2 * | 4/2022 | Kim | B62D 5/0463 |
| 12,024,247 | B2 * | 7/2024 | Schäfer | B62D 5/0481 |
| 2006/0086560 | A1 * | 4/2006 | Furusho | B62D 5/0463 180/446 |

(Continued)

FOREIGN PATENT DOCUMENTS

| | | | | |
|---|---|---|---|---|
| CN | 101900637 | A  * | 12/2010 | B62D 5/0481 |
| CN | 106004994 | A  * | 10/2016 | B62D 6/006 |

(Continued)

OTHER PUBLICATIONS

Office Action issued on Mar. 18, 2025, for corresponding Korean Patent Application No. 10-2022-0106582, along with an English machine translation (9 pages).

*Primary Examiner* — Kevin R Steckbauer
(74) *Attorney, Agent, or Firm* — Hauptman Ham, LLP

(57) ABSTRACT

In the present disclosure, the method and apparatus for controlling an electronic power steering system include estimating a vehicle's rack force value when the vehicle's cumulative driving distance is greater than or equal to a reference driving distance, comparing the estimated rack force value with learning data, increasing the number of friction detections when the estimated rack force value is greater than the learning data, and outputting an alarm when the number of friction detections is greater than or equal to a critical number, and it may be applied to other exemplary embodiments.

15 Claims, 3 Drawing Sheets

(56) References Cited

U.S. PATENT DOCUMENTS

| | | | |
|---|---|---|---|
| 2010/0211264 A1* | 8/2010 | Wey | B62D 6/00 |
| | | | 701/41 |
| 2010/0268422 A1* | 10/2010 | Blommer | B62D 5/0472 |
| | | | 701/44 |
| 2016/0280251 A1* | 9/2016 | George | B62D 6/006 |
| 2018/0009443 A1* | 1/2018 | Norstad | B62D 5/0463 |
| 2019/0355187 A1 | 11/2019 | Frankovics et al. | |
| 2019/0389509 A1* | 12/2019 | Kim | B62D 5/0484 |
| 2021/0179168 A1* | 6/2021 | Zeiler | B62D 15/0215 |
| 2022/0048563 A1* | 2/2022 | Schäfer | B62D 5/0481 |
| 2024/0067261 A1* | 2/2024 | Kim | B62D 5/046 |
| 2024/0140525 A1* | 5/2024 | Maruyama | B62D 5/0457 |

FOREIGN PATENT DOCUMENTS

| | | | | |
|---|---|---|---|---|
| CN | 106004994 B | * | 7/2018 | B62D 6/006 |
| CN | 108778900 A | * | 11/2018 | B62D 15/021 |
| CN | 107499373 B | * | 3/2020 | B62D 5/04 |
| CN | 116811995 A | * | 9/2023 | |
| CN | 119226660 A | * | 12/2024 | |
| DE | 102011015696 A1 | * | 10/2012 | B62D 5/0457 |
| DE | 102015206837 A1 | * | 10/2016 | B62D 5/0481 |
| DE | 102016105498 B4 | * | 6/2020 | B62D 6/006 |
| DE | 102021208165 A1 | * | 2/2022 | B62D 15/02 |
| DE | 102021208165 B4 | * | 5/2024 | B62D 15/02 |
| KR | 10-2016-0051032 A | | 5/2016 | |
| KR | 10-2017-0059113 A | | 5/2017 | |

* cited by examiner

METHOD AND APPARATUS FOR CONTROLLING ELECTRONIC POWER STEERING SYSTEM

CROSS-REFERENCE TO RELATED APPLICATION

This application claims priority to and the benefit of Korean Patent Application No. 10-2022-0106582, filed on Aug. 25, 2022, the disclosure of which is incorporated herein by reference in its entirety.

TECHNICAL FIELD

The present disclosure relates to method and apparatus for controlling an electronic power steeling system.

BACKGROUND

An electronic power steering system detects steering torque which is generated by the rotation of a steering wheel and controls a motor to supply steering assist power which is proportional to the detected steering torque such that the steering control of a vehicle can be performed.

More specifically, the electronic power steering system is configured so that steering torque which is generated by the rotation of a steering wheel is transmitted to a rack bar via a rack-and-pinion mechanism, and steering assist power which is generated by the motor is transmitted to the rack bar according to the steering torque generated by the rotation of a steeling wheel. That is, the steering torque generated by the steering wheel and the steering assist power generated by the motor are combined to move the rack bar in the axial direction.

In such an electronic power steering system, as the driving distance of a vehicle increases, frictional force between various members of a mechanical part may decrease due to the wear or loosening of various mechanical parts of the mechanical part constituting the system, for example, a rack-and-pinion mechanism, a reducer and the like. As another example, frictional force between various members of the mechanical part may increase due to rust occurring on the rack-and-pinion mechanism, the reducer and the like.

An increase or decrease in the frictional force of the internal members of the electronic power steering system causes a problem in that the driver feels a different steering feeling compared to when the electronic power steering system was initially used. For example, the initial steering angle and steering torque are tuned to steering torque corresponding to each steering angle, and steering torque corresponding to the corresponding steering angle is generated according to the operation of a steering wheel. As the driving distance of a vehicle increases, wear due to deterioration of the inside of the system occurs, and when frictional force between various members decreases, steering torque generated at the same steering angle is reduced compared to the initial steering torque. In particular, the reduction in steering torque occurs more significantly in an on-center section in which there is a lot of motion of the steering wheel.

Rack force is calculated by using steering torque and motor d as steering torque changes, rack force also changes in a similar way, and the change of rack force gives the user a light steering feeling which is different from the initial steering feeling. Conventionally, a friction compensation gain is calculated according to changes in rack force, and the vehicle is physically controlled by using the same. However, in the case of physically controlling a vehicle in this way, there may be a problem in that the user cannot check the degree of the durability deterioration of an electronic power steering system.

SUMMARY

The exemplary embodiments of the present disclosure for solving the problems as described above are directed to providing a method and apparatus for controlling an electronic power steering system that can set a rack force value which becomes a criterion for determining whether high friction occurs based on the driving state of a vehicle in motion, and check the difference between a monitored rack force value and a set rack force value to provide a notification to the user.

The method for controlling an electronic steering system according to an exemplary embodiment of the present disclosure includes steps of estimating a rack force value of a vehicle when a cumulative driving distance of the vehicle is greater than or equal to a reference driving distance; comparing the estimated rack force value with learning data; increasing the number of friction detections when the estimated rack force value is greater than the learning data; and outputting an alarm when the number of friction detections is greater than or equal to a critical number.

In one embodiment, the method further includes a step of generating the learning data by checking the driving state of the vehicle in real time or periodically when the cumulative driving distance is less than the reference driving distance.

In one embodiment, the step of generating the learning data includes the steps of estimating the rack force value of the vehicle when the driving state of the vehicle converges to a condition; calculating an average value of the estimated rack force values; and generating the learning data by using the calculated average value.

In one embodiment, the method further includes a step of checking whether the number of friction detections is stored when the cumulative driving distance is greater than or equal to the reference driving distance.

In one embodiment, the method further includes a step of initializing the number of friction detections when the number of friction detections is not stored.

In one embodiment, the step of increasing the number of friction detections includes a step of increasing the number of friction detections when the estimated rack force value is greater than the learning data by a critical value or more.

In one embodiment, the step of estimating a rack force includes a step of estimating the rack force value based on a motor current, a torque value and a steering speed when the driving state of the vehicle converges to the condition.

In one embodiment, the condition includes the curvature of a road on which the vehicle is traveling and the driving speed of the vehicle, which are checked based on the steering speed, a steering angle and a steering torque of the vehicle.

Moreover, the apparatus for controlling an electronic steering system according to an exemplary embodiment of the present disclosure includes at least one sensor for acquiring sensing data for a driving state of a vehicle in motion; and a controller for estimating a rack force value based on the sensing data when the cumulative driving distance of the vehicle is greater than or equal to a reference driving distance, comparing the estimated rack force value to learning data, and outputting an alarm by checking whether the number of friction detections is greater than or equal to a critical number when the estimated rack force value is greater than the learning data.

In one embodiment, the controller generates the learning data by checking the driving state of the vehicle in real time or periodically when the cumulative driving distance is less than the reference driving distance.

In one embodiment, the controller estimates the rack force value of the vehicle when the driving state converges to a condition and generates the learning data as an average of the rack force value of the vehicle.

In one embodiment, the controller checks whether the number of friction detections is stored when the cumulative driving distance is greater than or equal to the reference driving distance.

In one embodiment, the controller initializes the number of friction detections when the number of friction detections is not stored.

In one embodiment, the controller increases the number of friction detections when the estimated rack force value is greater than the learning data by a critical value or more.

In one embodiment, the controller estimates the rack force value based on a motor current, a torque value and a steering speed when the driving state of the vehicle converges to the condition.

As described above, the method and apparatus for controlling an electronic power steering system according to the present disclosure has the effect of preventing accidents in advance that may occur due to the durability deterioration of an electronic steering system, by setting a rack force value which becomes a criterion for determining whether high friction occurs based on the driving state of a vehicle in motion, and checking the difference between a monitored rack force value and a set rack force value to provide a notification to the user.

DETAILED DESCRIPTION OF THE EXEMPLARY EMBODIMENTS

Figure 1:
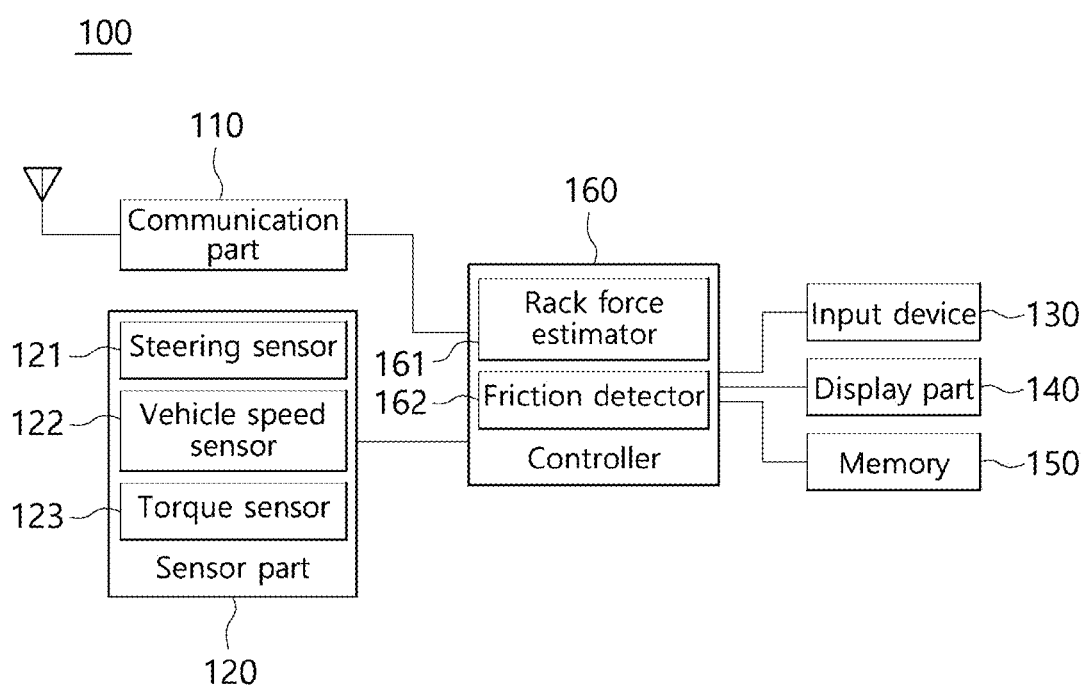
FIG. 1 is a diagram showing the apparatus for controlling an electronic power steering system according to an exemplary embodiment of the present disclosure.

The exemplary embodiments of the present disclosure are provided to further completely explain the present disclosure to one of ordinary skill in the art to which the present disclosure pertains. However, the exemplary embodiments described below may be modified in many different forms, and the scope of the present disclosure is not limited to the following exemplary embodiments. Rather, these exemplary embodiments are provided to render the present disclosure more thorough and complete, and to fully convey the spirit of the present disclosure to those skilled in the art.

Terms used in the present specification are used for explaining a specific exemplary embodiment, not for limiting the present disclosure. The expression of singularity in the present specification includes the expression of plurality unless clearly specified otherwise in context. In addition, terms such as "comprise" and/or "comprising" may be construed to denote a certain characteristic, number, step, operation, constituent element or a combination thereof, but may not be construed to exclude the existence of or a possibility of addition of one or more other characteristics, numbers, steps, operations, constituent elements or combinations thereof. As used in the present specification, the term "and/or" includes any one of listed items and all of at least one combination of the items.

Hereinafter, the exemplary embodiments of the present disclosure are described in detail with reference to the accompanying drawings that schematically illustrate the exemplary embodiments of the present disclosure. In the drawings, the illustrated shapes may be modified according to, for example, manufacturing technology and/or tolerance. Therefore, the exemplary embodiments of the present disclosure may not be construed to be limited to the specific shape of a part described in the present specification and may include for example, a change in the shape generated during manufacturing.

FIG. 1 is a diagram showing the apparatus for controlling an electronic power steering system according to an exemplary embodiment of the present disclosure. The steering system according to an exemplary embodiment of the present disclosure may be an advanced driver assistance system (ADAS) which is mounted on the own vehicle and provides information that is helpful for driving the own vehicle or provides assistance for the driver's control of the own vehicle. The ADAS may refer to various types of advanced driver assistance systems, and examples of the driver assistant systems may include, for example, the autonomous emergency braking system, the smart parking assistance system (SPAS), the blind spot detection system (BSD), the adaptive cruise control system (ACC), the land departure warning system (LDWS), the lane keeping assist system (LKAS), the lane change assist system (LCAS) and the like, but the present disclosure is not necessarily limited thereto.

Referring to FIG. 1, the apparatus for controlling an electronic power steering system 100 according to the present disclosure may include a communication part 110, a sensor part 120, an input device 130, a display part 140, a memory 150 and a controller 160. The sensor part 120 may include a steering sensor 121, a vehicle speed sensor 122 and a torque sensor 123, and the controller 160 may include a rack force estimator 161 and a friction detector 162.

The communication part 110 may receive map data, traffic information data and the like through communication with an external server (not illustrated) through communication with a network (not illustrated), and to this end, the communication part 110 may perform Internet communication such as $5^{th}$ generation (5G), long term evolution-advanced (LTE-A), long term evolution (LTE), wireless fidelity (Wi-Fi) and the like. Moreover, the communication part 110 may receive map data, traffic information data and the like from a portable device (not illustrated) through communication with the portable device that is installed in the vehicle, and receive sensing data through communication with a plurality of sensors that are provided in the vehicle. To this end, the communication part 110 may perform communication such as Bluetooth, controller area network (CAN) communication and the like.

The sensor part 120 obtains sensing data for the driving state of the vehicle while the vehicle is in motion and transmits the same to the controller 160. The steering sensor 121 obtains sensing data about the steering speed and steering angle of the vehicle in motion. The vehicle speed sensor 122 obtains sensing data about the driving speed of the vehicle in motion. The torque sensor 123 acquires sensing data about the steering torque of the vehicle in motion.

The input device 130 generates input data in response to a user's input using the vehicle. To this end, the input device 130 may include a key pad, a dome switch, a touch panel, touch keys and buttons.

The display part 140 displays output data according to the operation of the apparatus for controlling an electronic power steering system 100. In particular, the display part 140 may display a message informing that high friction has occurred according to the confirmation of the controller 160. To this end, the display part 140 may include a liquid crystal display (LCD), a light emitting diode (LED) display, an organic LED (OLED) display, a micro-electro mechanical systems (MEMS) display and an electronic paper display. Moreover, the display part 140 may be combined with the input device 130 and implemented as a touch screen or the like.

The memory 150 stores operating programs of the apparatus for controlling an electronic power steering system 100. In particular, the memory 150 may store learning data that is related to the accumulated driving distance of the vehicle and the rack force of the vehicle, and may store the number of friction detections, which is a criterion for confirming that high friction occurs in the vehicle. Moreover, the memory 150 may store algorithms and the like for generating learning data.

The controller 160 of the apparatus according to an exemplary embodiment of the present disclosure may be a processor (e.g., computer, microprocessor, CPU, ASIC, circuitry, logic circuits, etc.). The controller 160 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The controller 160 generates learning data for determining whether high friction occurs. The controller 160 checks the rack force value of the vehicle in motion, and when high friction occurs through comparison and analysis with the learning data, it is displayed on the display part 140 to provide a notification to the user. To this end, the controller 160 may include a rack force estimator 161 and a friction detector 162.

More specifically, the controller 160 checks the accumulated driving distance of the vehicle in motion in real time. If the checked cumulative driving distance is less than a reference driving distance, the controller 160 checks the driving state of the vehicle in motion in real time or periodically. The controller 160 checks sensing data for the steering speed and steering angle of the vehicle in motion which is received from the steering sensor 121 included in the sensor part 120, sensing data for the driving speed of the vehicle received from the vehicle speed sensor 122, and sensing data for the steering torque of the vehicle in motion which is received from the torque sensor 123. The controller 160 checks the curvature of a road on which the vehicle is driving based on the steering speed, steering angle and steering torque, and checks the driving speed of the vehicle. For example, if the curvature of the road is less than 10%, that is, the vehicle is driving on a straight road and the driving speed of the vehicle is 60 km/h or more, the driving state of the vehicle converges to a condition and can be confirmed to be in a stable state.

When the driving state of the vehicle is in a stable state, the rack force estimator 161 of the controller 160 estimates the rack force value of the vehicle based on the motor current, torque value and steering speed. The rack force estimator 161 may calculate an average value of the estimated rack force values, generate the calculated average value as learning data, and store the same in the memory 150. In addition, the controller 160 may check the ranges of motor current, torque value and steering speed according to the driving conditions of various vehicles, and calculate an average value of rack force values based on the estimated values of rack force values for the corresponding ranges. In this way, the controller 160 may generate learning data for rack force values corresponding to various driving states of the vehicle. When the generation of the learning data is completed in this way, the controller 160 checks the accumulated driving distance of the vehicle in motion in real time. The controller 160 checks whether the number of friction detections is stored in the memory 150 when the accumulated driving distance is greater than or equal to a reference driving distance. In this case, if the number of friction detections is not stored in the memory 150, the controller 160 initializes the number of friction detection, that is, it sets to 0.

Conversely, if the number of friction detections is stored, the controller 160 checks whether the vehicle in motion is in a stable state. In this case, the controller 160 checks sensing data for the steering speed and steering angle of the vehicle in motion which is received from the steering sensor 121 included in the sensor part 120, sensing data for the driving speed of the vehicle received from the vehicle speed sensor 122, and sensing data for the steering torque of the vehicle in motion which is received from the torque sensor 123. The controller 160 checks the curvature of a road on which the vehicle is driving based on the steering speed, steering angle and steering torque, and checks the driving speed of the vehicle. For example, if the curvature of the road is less than 10% (but not limited thereto), that is, the vehicle is driving on a substantially straight road and the driving speed of the vehicle is 60 km/h (but not limited thereto) or more, it is determined that the driving state of the vehicle converges to a condition and can be confirmed to be in a stable state.

As such, when the vehicle in motion is in a stable state, the rack force estimator 161 of the controller 160 estimates the rack force value of the vehicle based on the motor current, torque value and steering speed of the vehicle in motion. The friction detector 162 of the controller 160 compares the estimated rack force value with learning data stored in the memory 150, and if the estimated current rack force value is greater than the learning data, the controller 160 increases the number of friction detections stored in the memory 150 according to the confirmation result of the friction detection unit 162. If the increased number is greater than or equal to a critical number, the controller 160 may determine that high friction has been detected more than the critical number of times and output an alarm, which indicates that durability deterioration has occurred in the electronic power steering system, to the display part 140.

In addition, when the friction detector 162 generates learning data, if rack force values according to the driving conditions of various vehicles are generated, it can be confirmed whether high friction has occurred by checking the ranges including the motor current, torque value and steering speed that are checked when estimating the rack force value in the learning data, and checking the average value for the corresponding ranges.

Figure 2:
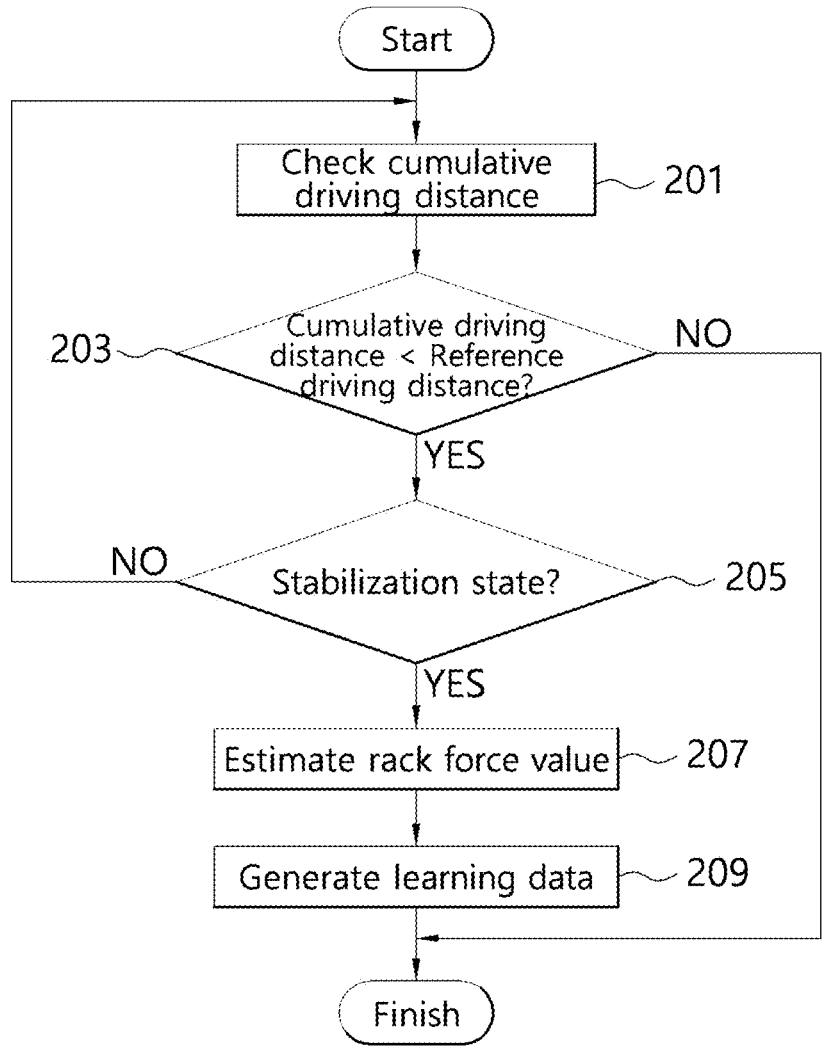
FIG. 2 is a flowchart for explaining the method of generating learning data for controlling an electronic power steering system according to an exemplary embodiment of the present disclosure.

FIG. 2 is a flowchart for explaining the method of generating learning data for controlling an electronic power steering system according to an exemplary embodiment of the present disclosure.

Referring to FIG. 2, in step 201, the controller 160 checks the accumulated the driving distance of the vehicle in motion and performs step 203. In step 203, the controller 160 performs step 205 if the accumulated driving distance is less than a reference driving distance, and finishes the corresponding process if the accumulated driving distance is greater than or equal to the reference driving distance.

In step 205, the controller 160 checks whether the vehicle in motion is in a stable state. In this case, the controller 160 checks sensing data for the steering speed and steering angle of the vehicle in motion which is received from the steering sensor 121 included in the sensor part 120, sensing data for the driving speed of the vehicle received from the vehicle speed sensor 122, and sensing data for the steering torque of the vehicle in motion which is received from the torque sensor 123. The controller 160 checks the curvature of a road on which the vehicle is driving based on the steering speed, steering angle and steering torque, and checks the driving speed of the vehicle. For example, if the curvature of the road is less than 10%, that is, the vehicle is driving on a straight road and the driving speed of the vehicle is 60 km/h or more, the controller 160 determines that the driving state of the vehicle converges to a condition and is in a stable state, and performs step 207. Conversely, if the driving state of the vehicle does not converge to the condition, the controller 160 may return to step 201 and perform steps 201 to 205 again.

In step 207, the rack force estimator 161 of the controller 160 estimates the rack force value of the vehicle based on the motor current, torque value and steering speed, and performs step 209. In step 209, the rack force estimator 161 may calculate an average value of the estimated rack force values, generate the calculated average value as learning data, and store the same in the memory 150. In addition, the controller 160 may generate learning data by estimating each rack force value according to the driving state of the vehicle and calculating an average value of each estimated rack force value according to the driving state of the vehicle.

Figure 3:
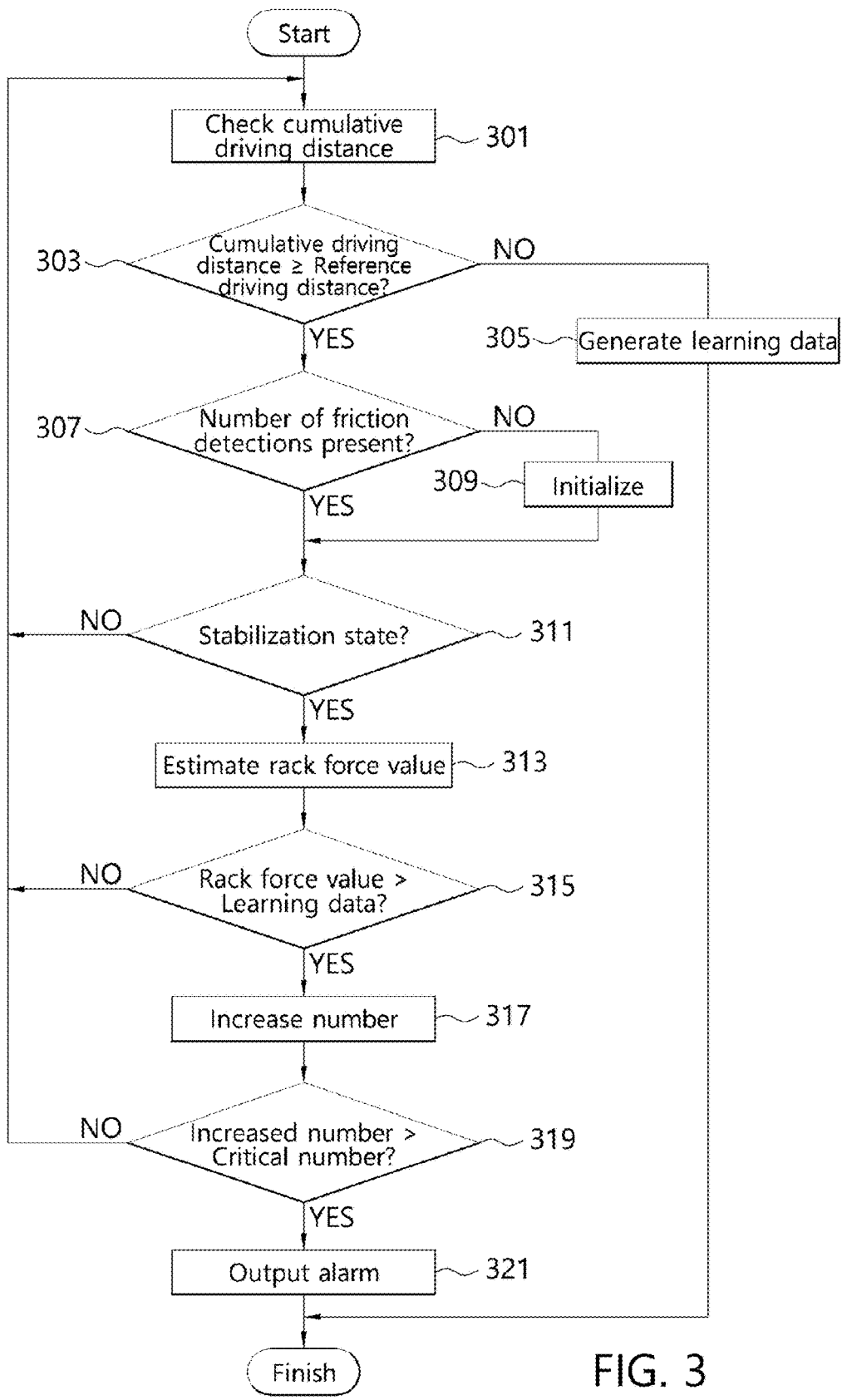
FIG. 3 is a flowchart for explaining the method for controlling an electronic power steering system according to an exemplary embodiment of the present disclosure.

FIG. 3 is a flowchart for explaining the method for controlling an electronic power steering system according to an exemplary embodiment of the present disclosure.

Referring to FIG. 3, in step 301, the controller 160 checks the accumulated driving distance of the vehicle in motion and performs step 303. In step 303, the controller 160 performs step 305 if the accumulated driving distance is less than a reference driving distance, and performs step 307 if the accumulated driving distance is greater than or equal to the reference driving distance. In step 305, the controller 160 may finish the corresponding process after generating learning data as shown in FIG. 2. In addition, in the exemplary embodiment of the present disclosure, it has been described that the corresponding process is terminated after step 305, but the present disclosure is not necessarily limited thereto, and it may return to step 301 after generating learning data.

In step 307, the controller 160 performs step 311 if the number of friction detections is stored in the memory 150, and performs step 309 if the number of friction detections is not stored. In step 309, the controller 160 initializes the number of friction detections, that is, it sets to 0, and then performs step 311.

In step 311, the controller 160 checks whether the vehicle in motion is in a stable state. In this case, the controller 160 checks sensing data for the steering speed and steering angle of the vehicle in motion which is received from the steering sensor 121 included in the sensor part 120, sensing data for the driving speed of the vehicle received from the vehicle speed sensor 122, and sensing data for the steering torque of the vehicle in motion which is received from the torque sensor 123. The controller 160 checks the curvature of a road on which the vehicle is driving based on the steering speed, steering angle and steering torque, and checks the driving speed of the vehicle. For example, if the curvature of the road is less than 10%, that is, the vehicle is driving on a straight road and the driving speed of the vehicle is 60 km/h or higher, the controller 160 confirms that the driving state of the vehicle converges to a condition and is in a stable state, and performs step 313. Conversely, if the driving conditions of the vehicle do not converge to the condition, the controller 160 may return to step 301 and perform steps 301 to 311 again.

In step 313, the rack force estimator 161 of the controller 160 estimates the rack force value of the vehicle based on the motor current, torque value and steering speed, and performs step 315. In step 315, the friction detector 162 of the controller 160 compares the estimated rack force value with the learning data stored in the memory 150, and if the estimated current rack force value is greater than the learning data, it performs step 317. In addition, if the current rack force value is less than or equal to the learning data, it may return to step 301. More specifically, the friction detector 162 may perform step 317 by confirming that high friction has occurred if the estimated rack force value is greater than the learning data by a critical value or more, for example, by 30% or more. In addition, the friction detector 162 checks the ranges including the checked motor current, torque value and steering speed when estimating the rack force value in the learning data, and checks the average value for the corresponding ranges to determine whether high friction has occurred.

In step 317, the controller 160 increases the number of friction detections stored in the memory 150 according to the confirmation result of the friction detector 162 and performs step 319. In step 319, the controller 160 may perform step 321 if the increased number is greater than or equal to a critical number, and may return to step 301 and perform steps 301 to 319 again if the increased number is less than the critical number.

In step 321, the controller 160 may output an alarm, which indicates that durability deterioration has occurred in the electronic power steering system, to the display part 140, because high friction is detected more than a critical number of times. As a result, the user can recognize that durability deterioration has occurred in the electronic steering system before physical problems occur in the vehicle, and by repairing the same, it has the effect of preventing accidents in advance that may occur due to durability deterioration of the electronic steering system.

Meanwhile, the exemplary embodiments disclosed in the present specification and drawings are merely presented to easily describe the technical contents of the present disclosure and help the understanding of the present disclosure and are not intended to limit the scope of the present disclosure. Therefore, all changes or modifications derived from the technical idea of the present disclosure as well as the exemplary embodiments described herein should be interpreted to belong to the scope of the present disclosure.

What is claimed is:

1. A method for controlling an electronic steering system, comprising steps of:
   estimating a rack force value of a vehicle in response to a cumulative driving distance of the vehicle being greater than or equal to a reference driving distance;
   comparing the estimated rack force value with learning data;
   increasing a number of friction detections in response to the estimated rack force value being greater than the learning data; and
   outputting an alarm in response to the number of friction detections being greater than or equal to a critical number.

2. The method of claim 1, further comprising a step of:
   generating the learning data by checking a driving state of the vehicle in real time or periodically when the cumulative driving distance is less than the reference driving distance.

3. The method of claim 2, wherein the step of generating the learning data comprises steps of:
   estimating the rack force value of the vehicle when the driving state of the vehicle converges to a condition;
   calculating an average value of the estimated rack force value; and
   generating the learning data by using the calculated average value.

4. The method of claim 3, further comprising a step of:
   checking whether the number of friction detections is stored when the cumulative driving distance is greater than or equal to the reference driving distance.

5. The method of claim 4, further comprising a step of:
   initializing the number of friction detections when the number of friction detections is not stored.

6. The method of claim 5, wherein the step of increasing the number of friction detections comprises a step of increasing the number of friction detections when the estimated rack force value is greater than the learning data by a critical value or more.

7. The method of claim 6, wherein the step of estimating a rack force value comprises a step of estimating the rack force value based on a motor current, a torque value and a steering speed when the driving state of the vehicle converges to the condition.

8. The method of claim 7, wherein the condition includes the curvature of a road on which the vehicle is traveling and the driving speed of the vehicle, which are checked based on the steering speed, a steering angle and a steering torque of the vehicle.

9. An apparatus for controlling an electronic steering system, comprising:
   at least one sensor for acquiring sensing data for a driving state of a vehicle in motion; and
   a controller configured to estimate a rack force value based on the acquired sensing data in response to a cumulative driving distance of the vehicle being greater than or equal to a reference driving distance, to compare the estimated rack force value to learning data, and to output an alarm by checking whether a number of friction detections is greater than or equal to a critical number in response to the estimated rack force value being greater than the learning data.

10. The apparatus of claim 9, wherein the controller generates the learning data by checking the driving state of the vehicle in real time or periodically when the cumulative driving distance is less than the reference driving distance.

11. The apparatus of claim 10, wherein the controller estimates the rack force value of the vehicle when the driving state converges to a condition and generates the learning data as an average value of the rack force value of the vehicle.

12. The apparatus of claim 11, wherein the controller checks whether the number of friction detections is stored when the cumulative driving distance is greater than or equal to the reference driving distance.

13. The apparatus of claim 12, wherein the controller initializes the number of friction detections when the number of friction detections is not stored.

14. The apparatus of claim 13, wherein the controller increases the number of friction detections when the estimated rack force value is greater than the learning data by a critical value or more.

15. The apparatus of claim 14, wherein the controller estimates the rack force value based on a motor current, a torque value and a steering speed when the driving state of the vehicle converges to the condition.

* * * * *